(12) United States Patent
Stoll et al.

(10) Patent No.: US 9,377,142 B2
(45) Date of Patent: Jun. 28, 2016

(54) HOSE CLAMP WITH A CLAMPING SCREW, CLAMPING SCREW AND TOOL FOR DRIVING THE CLAMPING SCREW

(75) Inventors: Viktor Stoll, Grosskrotzenburg (DE); Mathias Krauss, Nidderau (DE)

(73) Assignee: NORMA GERMANY GMBH, Maintal (DE)

( * ) Notice: Subject to any disclaimer, the term of this patent is extended or adjusted under 35 U.S.C. 154(b) by 121 days.

(21) Appl. No.: 13/210,860

(22) Filed: Aug. 16, 2011

(65) Prior Publication Data

US 2012/0047692 A1    Mar. 1, 2012

(30) Foreign Application Priority Data

Aug. 28, 2010  (DE) .......................... 10 2010 035 755

(51) Int. Cl.
*F16L 33/08* (2006.01)
(52) U.S. Cl.
CPC .............. *F16L 33/08* (2013.01); *Y10T 24/1427* (2015.01); *Y10T 24/1431* (2015.01)
(58) Field of Classification Search
CPC .......... F16L 33/08; F16L 33/04; F16B 35/06; F16B 23/0007; F16B 23/0061; F16B 23/0069; Y10T 24/1427; Y10T 24/1431
USPC ........... 24/274 WB, 274 R, 19, 279; 411/402, 411/405
See application file for complete search history.

(56) References Cited

U.S. PATENT DOCUMENTS

| 682,134 | A | * | 9/1901 | Rodd | 431/314 |
| 1,284,101 | A | * | 11/1918 | Hemenway | 411/402 |
| 2,180,633 | A | * | 11/1939 | Holt | 411/405 |
| 2,770,998 | A | * | 11/1956 | Schwartz | 411/403 |
| 2,910,758 | A | * | 11/1959 | Meirion | 24/274 R |
| 3,313,198 | A | * | 4/1967 | Walton | 411/402 |
| 3,379,231 | A | * | 4/1968 | Gallo, Sr. | 81/455 |
| 4,430,035 | A | * | 2/1984 | Rodseth | 411/402 |
| 4,480,514 | A | * | 11/1984 | Ponziani | 81/461 |
| 4,528,730 | A | * | 7/1985 | Spaulding | 24/274 R |
| 4,530,524 | A | * | 7/1985 | Stephens | 285/187 |
| 4,613,265 | A | * | 9/1986 | Visinand | 411/120 |
| 4,706,346 | A | * | 11/1987 | Verges | 24/274 R |
| 5,199,335 | A | * | 4/1993 | Arnold et al. | 81/177.8 |
| 2,940,150 | A |   | 11/1997 | RIZZO |  |

(Continued)

FOREIGN PATENT DOCUMENTS

| CN | 86101574 | 11/1986 |
| CN | 2388465 | 7/2000 |

(Continued)

OTHER PUBLICATIONS

Russian Office Action conducted in counterpart Russian Appln. No. 2011135485/06(052672 (Oct. 11, 2012) (w/ English language translation).

(Continued)

*Primary Examiner* — Jack W Lavinder

(74) *Attorney, Agent, or Firm* — Greenblum & Bernstein, P.L.C.

(57) ABSTRACT

Hose clamp and method of making hose clamp. Hose clamp includes a clamping band, a clamping screw having a screw head and a threaded shank, and a housing in which the clamping screw is arranged, which has a screw head and a threaded shank. A surface of the screw head facing away from the threaded shank is arched in a convex manner and includes at least three indentations.

14 Claims, 1 Drawing Sheet

(56) References Cited

U.S. PATENT DOCUMENTS

| | | | |
|---|---|---|---|
| 5,682,651 A | 11/1997 | Sauer | |
| 6,158,094 A * | 12/2000 | Clanin | 24/274 R |
| 6,449,813 B2 * | 9/2002 | Keller et al. | 24/274 R |
| 6,845,549 B2 * | 1/2005 | Keller et al. | 24/274 R |
| 6,905,145 B2 * | 6/2005 | Krauss et al. | 285/242 |
| 7,073,416 B2 * | 7/2006 | Kozak et al. | 81/460 |
| 7,237,464 B2 * | 7/2007 | Mekler | B25B 13/50 |
| | | | 81/176.15 |

FOREIGN PATENT DOCUMENTS

| | | |
|---|---|---|
| CN | 2692398 | 4/2005 |
| CN | 201100301 | 8/2008 |
| DE | 23 06 991 | 9/1973 |
| DE | 32 28 281 | 2/1983 |
| JP | 50-51066 | 5/1975 |
| JP | 2000-46027 | 2/2000 |
| JP | 2006-307948 | 11/2006 |
| JP | 2008-275055 | 11/2008 |
| JP | 2011-12788 | 1/2011 |
| RU | 2001320 | 10/1993 |
| RU | 2194208 | 12/2002 |
| SU | 410176 | 1/1974 |

OTHER PUBLICATIONS

Japanese Office action conducted in Japanese counterpart Appln. No. 2011-179452 (Feb. 12, 2013) (w/ partial English language translation).

German Office action conducted in counterpart German Appln. No. 10 2010 035 755.3 (Jul. 1, 2013) (w/ English language translation).

Chinese Office action conducted in counterpart Chinese Appln. No. 201110246573.9 (Jun. 20, 2013).

* cited by examiner

US 9,377,142 B2

HOSE CLAMP WITH A CLAMPING SCREW, CLAMPING SCREW AND TOOL FOR DRIVING THE CLAMPING SCREW

CROSS-REFERENCE TO RELATED APPLICATIONS

The present application claims priority under 35 U.S.C. §119 of German Patent Application No. 10 2010 035 755.3, filed on Aug. 28, 2010, the disclosure of which is expressly incorporated by reference herein in its entirety.

BACKGROUND OF THE INVENTION

1. Field of the Invention

Embodiments of the invention relate to a hose clamp with a clamping band and a housing having therein arranged a clamping screw with a screw head and a threaded shank. Furthermore, embodiments of the invention relate to a clamping screw, in particular for a hose clamp of this type, which has a screw head and a threaded shank. The invention also relates to a tool for tightening a hose clamp of this type and for driving the clamping screw.

2. Discussion of Background Information

Hose clamps are used in many technical fields and serve, for example, to brace hoses on pipe connections. The tightening of the hose clamps is often carried out in that a clamping screw, which is arranged in a housing that is attached to one end of the clamping band, interacts with a thread that is embodied or formed in the clamping band on the outside of the clamping band at least in the region of the other end. By screwing in the clamping screw, the free end of the clamping band is drawn into the housing, whereby the diameter of the hose clamp is reduced. Hose clamps of this type are generally known.

In various fields of application, for example, in automobile construction or in public buildings, it is desirable for tampering and in particular a loosening of the hose clamp to be prevented. Known solutions provide for this purpose that the screw head of the hose clamp is not embodied or formed as with a conventional screw, that is, with a slot or a cross recess, but with a hexagon socket or a multipoint socket, such that, if necessary, an additional pin can be provided in the center of the multipoint socket. Without the necessary, specially coordinated tool, releasing the hose clamp is thus more difficult. However, it is often possible to turn the clamping screw with a screwdriver or pliers and thus to tamper with the hose clamp.

Another solution provides a tear-off head for the clamping screw, which tears off when a predetermined torque is reached during tightening of the hose clamp. It is then no longer possible to unscrew the clamping screw and to release the hose clamp. Although this solution is very secure against tampering, it has the disadvantage that the torn off screw head falls off in an uncontrolled manner. This can lead to a blockage or at least the impairment of the function of surrounding components.

SUMMARY OF THE INVENTION

Embodiments of the invention are directed to clamping screws that render tampering with the clamping screw more difficult.

Embodiments of the invention are directed to a hose clamp of the type mentioned at the outset in that the screw head has a surface facing away from the threaded shank and arched in a convex manner, in which surface at least three indentations are provided.

Due to this type of embodiment of the screw head, it is possible to drive the clamping screw only with a special tool. Due to the surface of the screw head being arched in a convex manner, which is thus embodied or formed in a lenticular manner and thereby has a circular base area, it is very difficult to grasp the screw head with pliers. The indentations are embodied or formed on the outside, i.e., distributed along the circumference of the screw head, and thus are all located radially outside a rotation axis of the clamping screw. It is therefore not possible to use a commercially available screwdriver to open the clamping screw. A hose clamp is thus provided which is secure against tampering. At the same time, the surface of the screw head arched in a convex manner can be utilized to center a tool during placement on the screw head so that the handling of the hose clamp is also simplified.

Preferably, a center of the surface is embodied or formed in a smooth manner. This center is thereby located on the rotation axis of the clamping screw. If this center is embodied or formed in a smooth manner, it is not possible to attach there with a screwdriver or a similar tool. At the same time it is ensured that all indentations are arranged radially outside the rotation axis.

Preferably, the indentations run radially. The indentations can thus be distributed uniformly or non-uniformly over a circumference of the screw head, and can be arranged to run radially, and by way of example, to open radially outwards. The indentations run, as it were, radially outwards like rays.

Preferably, the indentations are arranged in a star-shaped manner, and, in particular, they can have identical distances from one another. The screw head can thus be embodied or formed in a rotationally symmetrical manner, which simplifies the placement of a tool and thus the handling of the hose clamp, since the tool does not need to have a special angle of rotation with respect to the clamping screw.

In an advantageous embodiment, the indentations may expand conically outwards, that is, each indentation expands in a direction from the base to the outer periphery of the indentation at the surface of the screw head. Stated another way, the outer periphery has a length extending between a pair of ends, as well as a width that is defined between a pair of arcs that are convergent toward each of the pair of ends, and the indentations include a pair of surface portions, which, in a particular embodiment, each of which can be a portion of a truncated cone, the two surface portion converging toward the base of the indentation in a direction extending from respective ones of the pair of arcs of the periphery. The indentations thus have a relatively narrow base and a relatively large opening width at the aforementioned outer periphery. The base can thereby be embodied or formed as a secant, that is, a line that lies within a radial plane with respect to a rotation axis of the clamping screw, and that that cuts the surface of the screw head at two points, namely the radial ends of the indentation. The indentations can thereby taper relatively sharply at the ends. Through this conical embodiment of the indentations, an alignment of the tool with respect to the clamping screw is possible, that is, an angular deviation between the rotation axis of the tool and the rotation axis of the clamping screw. This facilitates the handling of the hose clamp, in particular with narrow installation spaces.

Embodiments of the invention are directed to a clamping screw of the type mentioned at the outset in that the screw head has a surface that faces away from the threaded shank and that is arched in a convex manner, in which surface at least three indentations are provided.

Through the convex arching of the surface of the screw head, i.e., a lenticular embodiment, it is virtually impossible to grasp and to turn the screw head with pliers. Through the provision of the at least three indentations, which lie radially outside a rotation axis, a positive engagement can be produced with a tool embodied or formed in a corresponding manner, so that a driving of the clamping screw is easily possible. However, as driving the clamping screw with conventional tools like pliers or a screwdriver is very difficult to impossible, tampering with the clamping screw can be virtually ruled out.

A center of the surface is preferably embodied or formed in a smooth manner. The center of the surface lies on the rotation axis of the clamping screw. The indentations are thus all spaced radially apart from the rotation axis. Even if an engagement in one of the indentations is made with a screwdriver, a movement of the clamping screw is hardly possible. An attack on the rotation axis, as usual with screws, is prevented by the smooth surface in the center of the screw head.

Preferably, the indentations are arranged in a star-shaped manner, such that they can, in particular, have identical distances from one another. The indentations are arranged distributed along the circumference of the screw head. Further, the indentations can therefore run radially outwards, and can be arranged to open outwards. If the distances between the indentations are not identical, the possible multiplicity of different clamping screws or screw heads is increased. However, a uniform arrangement of the indentations, that is, if the distances between adjacent indentations are always identical, has the advantage that the angular alignment of the tool during placement on the screw head is less important. The handling of the clamping screw is thus simplified thereby.

Preferably, the indentations expand conically outwards from their bases. A bottom or base of each of the indentations is thus embodied or formed to be narrower than an opening width, wherein radial ends of the indentation can taper. Due to this embodiment, a driving of the clamping screw is possible even if a rotation axis of the tool runs at an angle to the rotation axis of the clamping screw. The handling of the clamping screw is simplified thereby.

Embodiments of the invention are directed to a tool of the type mentioned at the outset in that the tool has a seat with an interior open to a front face, in which seat at least three projections directed radially inwards are arranged.

The interior is embodied or formed as a hollow cylinder with a circular base area. This interior open to a front face is thereby centered independently during placement on the surface arched in a convex manner of the screw head of the clamping screw. The number of projections directed inwards should thereby correspond to the number of indentations and be arranged at corresponding points so that a positive connection between the projections and the indentations can be made. That is, the interior of the seat of the tool is structured to be complementary to the indentations on the screw head so as to drive the clamping screw.

It is particularly preferred thereby that an inside diameter of the interior is adapted to an outside diameter of the screw head and a number and a shape of the projections are adapted to a number and a shape of the indentations of the screw head. A relatively good centering of the tool on the clamping screw takes place due to the adaptation of the inside diameter of the interior to an outside diameter of the screw head. Through the adjustment of the number and shape of the projections to the number and shape of the indentations, relatively large contact surfaces are achieved between the tool and the clamping screw, so that relatively high forces can be transferred. Damage to the screw head by the tool is thus relatively rare even with high torques.

In a preferred embodiment, outer edges of the projections lying radially inside run parallel to one another. The outer edges of the projections can thereby also run parallel to an outside of the seat. A relatively simple production of the seat and/or the tool is possible thereby. With a conical embodiment of the indentations, a driving of the clamping screw is possible thereby even if a rotation axis of the tool is at an angular offset to the rotation axis of the clamping screw.

In another preferred embodiment, outer edges of the projections lying radially inside are curved in a convex manner. This embodiment simplifies the self-centering of the tool on the lenticular screw head and renders possible a larger alignment between the tool and the clamping screw, that is, a larger angular deviation between the rotation axis of the tool and the rotation axis of the clamping screw. The handling of the tool, in particular with narrow conditions, is therefore simplified.

Embodiments of the invention are directed to a hose clamp that includes a clamping band, a clamping screw having a screw head and a threaded shank, a housing in which the clamping screw is arranged, which has a screw head and a threaded shank, and a surface of the screw head facing away from the threaded shank being arched in a convex manner and including at least three indentations.

According to embodiments, a center of the surface can be a smooth surface.

In accordance with other embodiments, the indentations may be oriented to run radially.

According to aspects of the embodiments, the indentations can be arranged in a star-shaped manner. The indentations may have same distances between one another.

Moreover, the indentations can be structured to expand conically outwards.

Embodiments of the invention are directed to a clamping screw for a hose clamp. The clamping screw includes a screw head, a threaded shank, and a surface of the screw head away from the threaded shank being arched in a convex manner and including at least three indentations.

According to embodiments of the instant invention, a center of the surface can be formed as a smooth surface.

In accordance with other embodiments of the invention, the indentations can be arranged in a star-shaped manner.

Further, the indentations can be structured to expand conically outwards.

Embodiments of the invention are directed to a tool for tightening a hose clamp, as described above, and includes a seat with an interior open to a front face and at least three projections arranged in the seat being oriented to extend radially inwards.

According to embodiments of the present invention, an inside diameter of the interior can be structured to accommodate an outside diameter of the screw head and a number and a shape of the projections may be structured and arranged to correspond to the number and shape of the indentations in the screw head.

In accordance with still other embodiments, outer edges of the projections lying radially inside the seat can run parallel to one another.

Still further, outer edges of the projections lying radially inside the seat can be curved in a convex manner.

Embodiments of the invention are directed to a method of adjusting a hose clamp having a housing and clamping screw. The method includes placing a tool on a rounded head of the clamping screw, wherein the clamping screw has a smooth center surface, and rotating the tool to effect a tightening or loosening of the hose clamp.

According to other embodiments, the screw head can include at least one indentation and the tool can include at least one projection, such that the at least one projection fits within the at least one indentation. The at least one indentation can include at least three indentations, and the at least one projection may include a number of projections corresponding to the at least three indentations. The number of projections can be arranged parallel to each other.

In accordance with still yet other embodiments of the present invention, when a rotational axis of the tool is obliquely oriented to a rotational axis of the clamping screw, the rotating of the tool can provide sufficient torque to effect the tightening or loosening.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied or formed in practice.

Figure 1:
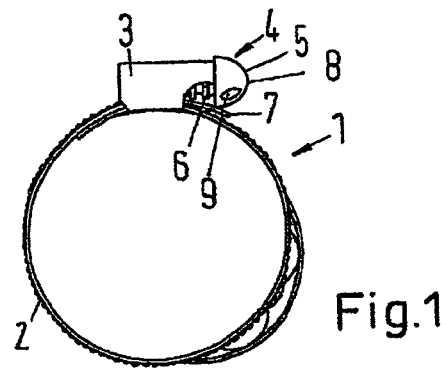
FIG. 1 illustrates a hose clamp.

FIG. 1 shows a hose clamp 1 with a clamping band 2. A housing 3 is arranged at a first end of clamping band 2, and a clamping screw 4 is accommodated in housing 3. Clamping screw 4 has a screw head 5 and a threaded shank 6. A second end 7 of clamping band 2 is guided radially outside the first end and, more particularly, is guided between the first end and threaded shank 6 of the clamping screw 4 arranged in housing 3. In this manner, the thread of threaded shank 6 is engaged with a corresponding thread that is embodied or formed on an outside of clamping band 2. By driving clamping screw 4, second end 7 is pushed out of housing 3 to a greater or lesser degree, so that the diameter of hose clamp 1 is changed to effect a tightening or loosening of hose clamp 1.

A hose clamp of this type is known to this extent.

The screw head 5 of the clamping screw 4 is provided with a surface arched in a convex manner, that is, embodied or formed in a lenticular manner, wherein the screw head 5 has a circular base area. Indentations 9 lying radially outside are embodied or formed in the screw head 5, wherein the surface 8 is embodied or formed in a smooth manner in the region of a center of the screw head 5. The indentations 9 can be embossed or pressed in, for example.

Figure 2:
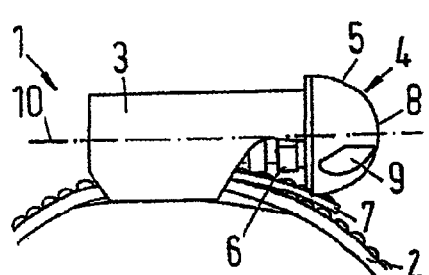
FIG. 2 illustrates an enlarged section from FIG. 1.

FIG. 2 shows a section of the hose clamp 1 according to FIG. 1, in which identical elements are provided with identical reference numbers. It is discernible that the smooth center of screw head 5 lies on a rotation axis 10 of clamping screw 4. In this way, indentations 9 are spaced radially apart from rotation axis 10.

Figure 3:
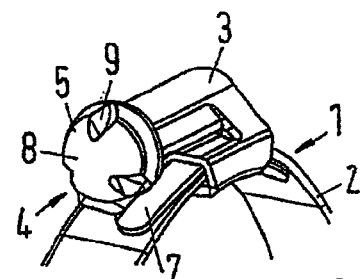
FIG. 3 illustrates a three dimensional depiction of the section shown in FIG. 2.

FIG. 3 shows FIG. 2 in a three-dimensional representation. In this exemplary embodiment, clamping screw 4 has a total of three indentations 9, which are arranged in a star-shaped manner and have a constant distance from one another. Indentations 9 can thus be distributed uniformly along a circumference of the base of screw head 5 of clamping screw 4, whereby each extends along a respective radial plane extending from the rotation axis 10 of the clamping screw 4. Indentations 9 are thereby embodied or formed so that they widen conically outwards from their respective bases, i.e., they have a relatively large opening width and a relatively narrow bottom or base.

Figure 4:
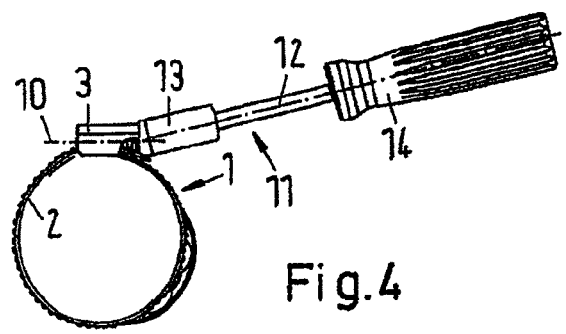
FIG. 4 illustrates a hose clamp with tool.

FIG. 4 shows hose clamp 1 in connection with a tool 11, which serves to drive (rotate) clamping screw 4. Tool 11 is shown at an angle to clamping screw 4. A rotation axis 12 of tool 11 can thus be oriented at an angle to axis of rotation 10 of the clamping screw 4 and still provide sufficient torque to drive clamping screw 4. This alignment is possible due to the lenticular embodiment of the screw head in connection with the indentations 9 lying radially outside.

Tool 11 has a seat 13, which is connected to a tool handle 14. Seat 13 is embodied or formed in a cylindrical manner and has a cylindrical interior, which is open to a front face, that serves to accommodate screw head 5. However, it does not need to be possible to accommodate the entire screw head 5, i.e., it is sufficient if screw head 5 can be inserted so far into seat 13 that projections arranged in the interior can engage in indentations 9 on screw head 5.

Figure 5:
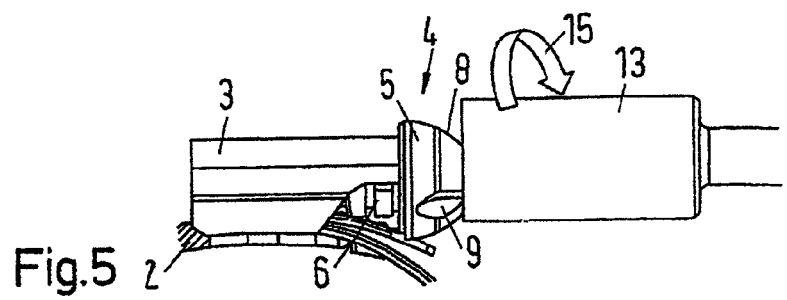
FIG. 5 illustrates a section of the hose clamp with tool.

FIG. 5 shows tool 11 with an enlarged view of clamping screw 4. Rotational axis 12 of tool 11 can be offset from parallel (or out of alignment) with rotational axis 10 of clamping screw 4. This offset is compensated for during the placement of seat 13 on screw head 5 by sliding seat 13 on surface 8 of screw head 5. A self-centering, as it were, of seat 13 on screw head 5 takes place. A possible rotational movement of tool 11 to drive clamping screw 4, which leads to the tightening or releasing of hose clamp 1, is symbolized by an arrow 15.

Through the embodiment of a clamping screw 4 with a screw head 5, which has indentations 9 arranged radially outside a rotation axis 10, which are open radially outwards, in connection with a surface of the screw head 5 arched in a convex manner, a clamping screw 4 or a hose clamp 1 with a clamping screw 4 of this type is obtained, which cannot be tampered with easily. In this way, a simple handling with a corresponding special tool 11 is ensured at the same time. Further, variations compared to the exemplary embodiment shown are conceivable thereby. For example, a greater number of indentations 9, a non-uniform distribution of indentations 9 over the circumference of screw head 5 and a deviating shape of indentations 9. Seat 13 of tool 11 must then be embodied or formed in a corresponding manner. The tool can also be embodied or formed in a multiple-part manner. For example, the seat 13 can be embodied or formed as a slip-on element (bit), which can be connected, e.g., with handles, but also electrically or pneumatically driven machine tools.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A hose clamp comprising:
   a clamping band;
   a clamping screw having a screw head and a threaded shank;
   a housing in which the clamping screw is arranged;
   a surface of the screw head facing away from the threaded shank being arched in a convex manner and including at least three indentations; and
   each of the indentations comprising:
      an elongated outer periphery at the surface of the screw head, the outer periphery comprising:
         a length extending between a pair of ends; and
         a width defined between a pair of arcs convergent toward each of the pair of ends;
      a base; and
      a pair of surface portions convergent toward the base in a direction extending from respective ones of the pair of arcs of the periphery.

2. The hose clamp according to claim 1, wherein a center of the surface is a smooth surface.

3. The hose clamp according to claim 1, wherein the indentations are oriented to run radially from a rotation axis of the clamping screw.

4. The hose clamp according to claim 1, wherein the indentations are arranged in a star-shaped manner, radiating from a rotation axis of the clamping screw.

5. The hose clamp according to claim 4, wherein the indentations in the star-shaped arrangement are spaced from one another by a constant distance.

6. A method of adjusting the hose clamp according to claim 1 with a tool comprising an interior having projections complementarily structured to drive the clamping screw by engagement with the indentations of the screw head, said method comprising:
   placing a tool on the screw head of the clamping screw, wherein the screw head, which is arched in a convex manner, has a smooth center surface;
   engaging the indentations of the screw head with the projections of the tool; and
   rotating the tool to effect a tightening or loosening of the hose clamp.

7. The method according to claim 6, wherein, when a rotational axis of the tool is obliquely oriented to a rotational axis of the clamping screw, the rotating of the tool provides sufficient torque to effect the tightening or loosening.

8. The hose clamp according to claim 1, wherein each of the pair of surface portions of each of the indentations of the clamping screw widens conically outwards away from the base.

9. The hose clamp according to claim 1, wherein the base of each indentation is embodied as a line that lies within a radial plane with respect to a rotation axis of the clamping screw, the line cutting the surface of the screw head at each of the pair of ends of each of the indentations.

10. A hose clamp clamping screw for a hose clamp, comprising:
    a screw head;
    a threaded shank; and
    a surface of the screw head facing away from the threaded shank, which is structured to receive a driving tool to rotate the screw head, being arched in a convex manner and including at least three indentations; and
    each of the indentations comprising:
       an elongated outer periphery at the surface of the screw head, the outer periphery comprising:
          a length extending between a pair of ends; and
          a width defined between a pair of arcs convergent toward each of the pair of ends;
       a base; and
       a pair of surface portions convergent toward the base in a direction extending from respective ones of the pair of arcs of the periphery.

11. The hose clamp clamping screw according to claim 10, wherein a center of the surface is formed as a smooth surface.

12. The hose clamp clamping screw according to claim 10, wherein the indentations are arranged in a star-shaped manner, radiating from a rotation axis of the clamping screw.

13. The hose clamp clamping screw according to claim 10, wherein each of the pair of surface portions of each of the indentations of the clamping screw widens conically outwards away from the base.

14. The hose clamp clamping screw according to claim 10, wherein the base of each indentation is embodied as a line that lies within a radial plane with respect to a rotation axis of the clamping screw, the line cutting the surface of the screw head at each of the pair of ends of each of the indentations.

* * * * *